(Model.)
S. N. SILVER.
TRICYCLE.
No. 250,589. Patented Dec. 6, 1881.
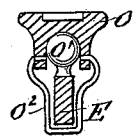
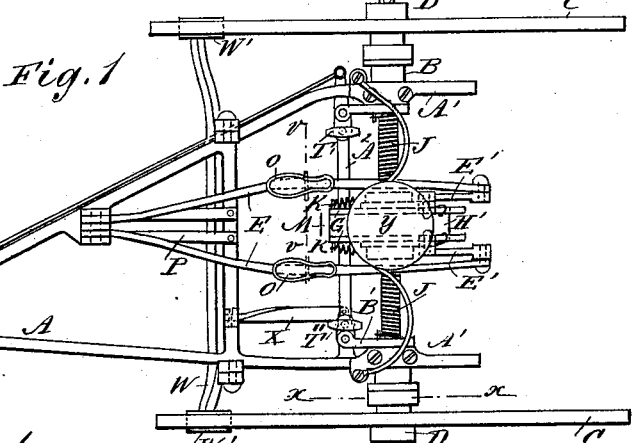
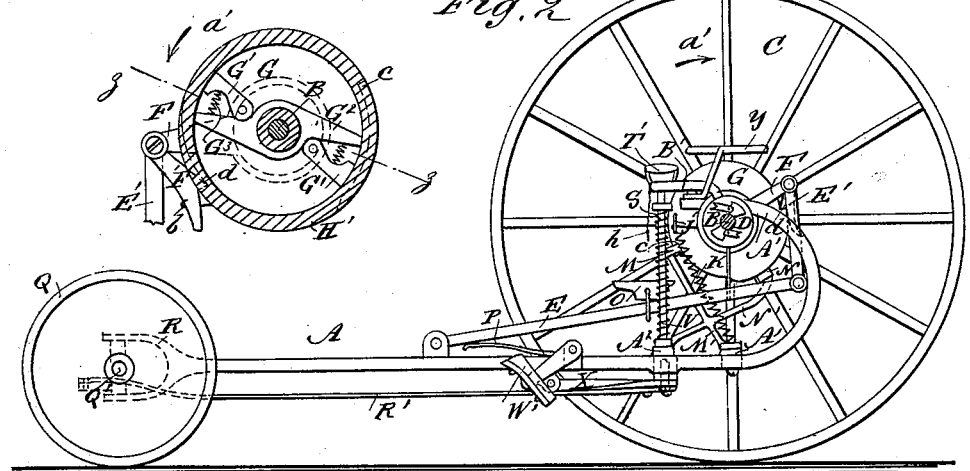
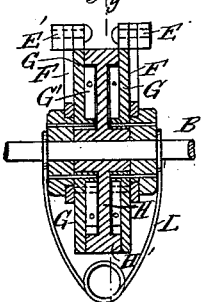
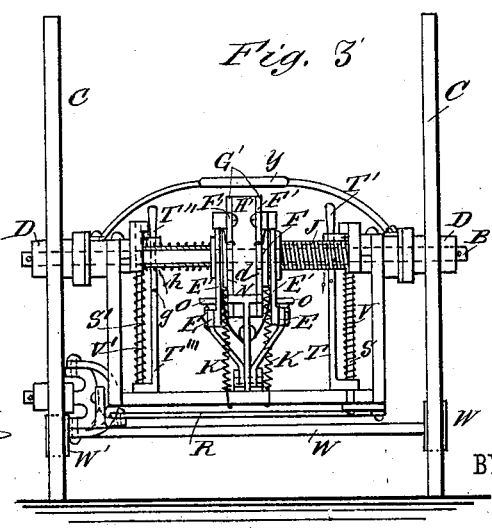
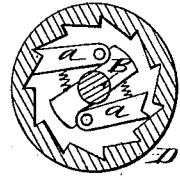
WITNESSES:
C. Neveux
C. Sedgwick
INVENTOR:
S. N. Silver
BY Munn & Co
ATTORNEYS.

UNITED STATES PATENT OFFICE.

SAMUEL N. SILVER, OF AUBURN, MAINE.

TRICYCLE.

SPECIFICATION forming part of Letters Patent No. 250,589, dated December 6, 1881.

Application filed August 4, 1881. (Model.)

*To all whom it may concern:*

Be it known that I, SAMUEL N. SILVER, of Auburn, in the county of Androscoggin and State of Maine, have invented a new and Improved Tricycle, of which the following is a specification.

The object of my invention is to provide a new and improved tricycle, or self-propelling vehicle, which is so constructed that it can be propelled, steered, and controlled very easily by the occupant.

The invention consists in a tricycle provided with two pivoted foot-levers connected with arms loosely mounted on the axle, and provided at the outer ends with pivoted pawls engaging in notches in disks loosely mounted on the axle, and provided with friction clutch-dogs catching on the inner surface of the circumferential flange of a disk rigidly mounted on the axle, whereby, when the foot-levers are depressed, springs on the axle connected with the loose disks, and other springs also connected with these disks, will be brought in tension, and when the pawls are released from the disks the springs revolve the loose disks which catch on the rigid disk, thereby rotating the axle and propelling the vehicle forward. The tricycle is provided with a brake operated by means of a handle sliding on a squared rod surrounded by a spiral spring, and the front guide or steering wheel is connected with a like squared rod provided with a handle and spring, these handles and springs being also used to increase the power for propelling the vehicle.

The invention further consists in the arrangement and construction of certain parts, as will be more fully described hereinafter.

In the accompanying drawings, Figure 1 is a plan view of my improved tricycle. Fig. 2 is a longitudinal elevation of the same, parts being shown in section on the line $x\ x$, Fig. 1. Fig. 3 is a rear elevation of the same. Fig. 4 is a longitudinal sectional elevation through the flanged disk rigidly mounted on the axle, on the line $y\ y$, Fig. 5. Fig. 5 is a cross-sectional elevation of the same on the line $z\ z$, Fig. 4. Fig. 6 is a cross-sectional elevation of the hub of the wheel. Fig. 7 is a cross-sectional elevation of the foot-lever and treadle, on the line $v\ v$, Fig. 1.

Similar letters of reference indicate corresponding parts.

A triangular frame, A, is bent upward at its rear or wide end to form journal boxes or bearings A', for an axle, B, on which the wheels C are rigidly mounted, or the axle can be provided with spring-pawls $a$, engaging with a circular rack or ratchet on the inner surface of the hub D of the wheels C, so that these wheels will only be rotated when the axle B rotates from right to left; but if the axle rotates in the inverse direction, the pawls cannot catch, and consequently cannot rotate the wheels.

Two levers, E, are pivoted to the frame A at a point in front of the axle B, and the swinging ends of each of these levers, which extend behind the axle, are pivoted to a connecting-rod, E', which is pivoted to an arm, F, loosely mounted on the axle, to the outer end of each of which arms F a pawl, F', is pivoted, which is pressed by a spring, $b$, against the edge of a disk, G, loosely mounted on the axle B, the circular edge of this disk being provided with notches or shoulders $c$ and $d$. A disk, H, provided with a broad rim, H', is rigidly mounted on the axle B, and one loose disk, G, rests against each side of this disk H. Two opposite friction clutch-dogs, G' G', are pivoted to the inner side of each disk G, and rest against a transverse ridge, G², on the inner side of the disk G, and are connected with this ridge by a spring, G³. Powerful springs J, coiled around the axle B, and rigidly connected therewith, are also connected with projections J' of the disks G, and powerful coiled springs K, attached to the transverse bar A' of the frame A, are also connected with the projections J' of the disks G. The arms F and the disks G and H are all held together by a coiled spring, L, as shown in Fig. 5.

A check-block, M, resting against the front of the rim of the disk H, is attached to the upper end of an arm, M', resting on the transverse bar A' of the frame, and a cam-block, N, resting against the rear of the rim of the disk H, is attached to the upper end of an arm, N', resting on the transverse bar A² of the frame A. Treadles O, provided on the under side with a socket, rest on balls O' on the levers E, and are held on these balls by stirrups O², surrounding the levers E. The levers E are pressed upward by springs P of the frame A.

A steering-wheel, Q, is loosely mounted on a short shaft, Q', pivoted in the front forked end, R, of the frame A. An arm, Q², of the shaft Q' is connected by means of a rod, R', with a crank or arm at the lower end of a squared rod, S, pivoted in the cross-piece A² and arms B' of the frame A. The lower bent end of a guided rod, T, provided with a handle, T', surrounds the rod S, so that the rod T can slide up and down on the rod S, and at the same time the rod S can be turned by means of the handle T'. A powerful spring, V, surrounds the rod S, and, resting against the lower bent end of the rod T, presses the same downward.

The rod T is provided with an aperture, $g$, to receive a pin, $h$, to lock the rod T in a raised position. A bar, W, having brake-shoes W' at the ends, is pivoted to the frame A, and can be pressed toward or from the wheels C by means of a handle, T'', of a rod, T''', (sliding on a rod, S',) the lower bent or angular end of which is pivoted to a connecting-rod, X, pivoted to the bar W. The handle T', for operating the guide or steering wheel Q, is at one side of the seat Y, and the handle T'', for operating the brakes, is on the other side of the seat, which is arranged above the clutch mechanism on the axle B.

The operation is as follows: The operator or occupant places his feet in the treadles O and grasps the handles T' T'' with his hands. The occupant or rider may sit or stand, as may be desired, and alternately depresses one lever E and then the other. By depressing a lever E the corresponding arm F will be turned in the direction of the arrow $a'$, and as the pawl F' catches on the shoulder $d$ of the disk G this disk will be rotated in the same direction, thereby stretching or lengthening the corresponding spring K, and twisting or winding up the spring J, as both of these springs are attached to the disk G; but when the lever E has been depressed as much as is possible the end of the pawl F' strikes the cam-block N, and is pressed outward, thereby releasing the disk G, which is immediately rotated in the inverse direction of the arrow $a'$ by the action of the springs J and K, which are in tension; but if the disk G moves in the inverse direction of the arrow $a'$, the clutch-dogs G' will catch on the inner surface of the rim H' of the disk H, and this rim and the axle B, to which it is rigidly attached, will also be rotated in the same direction, and the vehicle will be moved forward. By depressing the other lever E the above operation will be repeated, and so on. If desired, the springs K can be conveniently replaced by stronger or weaker springs, according to the strength and weight of the occupant or the speed desired. So that the springs J and K do not rotate the disks G too far in the inverse direction of the arrow $a'$, I have provided the check-block M, against which the shoulders $c$ of the disks G strike. If the power for driving the vehicle is to be increased, the occupant or rider pulls the handles T' T'' upward, thereby compressing the springs V V'. The springs V V' press downward and press the handles T' T'' in the same direction, and as the handles are held firmly by the rider these springs will pull the body of the rider downward, thus increasing the weight on the levers E. If the springs V V' are not to be in action, and the handles T' T'' are to be in a convenient position for the rider, the handles are raised until the apertures $g$ of the rods T are above the arm B', and then the pins $h$ are passed into the aperture $g$, thus holding the rods T T''' in a raised position.

If desired, the springs J only or the springs K only may be used.

Having thus fully described my invention, I claim as new and desire to secure by Letters Patent—

1. In a tricycle, the combination, with the axle B and wheels C, of the springs J, the loose disks G, the rigidly-mounted disk H, the arms F, the pawls F', the clutches G', the springs K, and the foot-levers E, substantially as herein shown and described, and for the purpose set forth.

2. In a tricycle, the combination, with the axle B and wheels C, of the disks G and H, the arms F, the pawls F', the clutches G', the foot-levers E, the springs J K, and the cam-block N, substantially as herein shown and described, and for the purpose set forth.

3. In a tricycle, the combination, with the axle B and the wheels C, of the disks G and H, the arms F, the pawls F', the clutches G', the foot-levers E, the cam-block N, the check-block M, and the springs J K, substantially as herein shown and described, and for the purpose set forth.

4. In a tricycle, the combination, with the lever E, provided with the ball O', of the treadle-shoe O, having a socket in the under side, and of the stirrup O², substantially as herein shown and described, and for the purpose set forth.

5. In a tricycle, the combination, with the frame A, the axle B, and the wheels C, of the guide or steering wheel Q, the arm Q² of the guide-wheel shaft Q', the rod R', the squared rod S, provided with a crank-arm at its lower end, and the rod T, provided with a handle, T', at its upper end and an eye in its lower angular end, substantially as herein shown and described, and for the purpose set forth.

6. In a tricycle, the combination, with the rods S S', and the sliding rods T T''', having angular lower ends and provided with handles T' T'' at their upper ends, of the springs V V', substantially as and for the purpose set forth.

7. In a tricycle, the combination, with the frame A, the axle B, and the wheels C, of the pivoted brake bar and shoes W W', the connecting-rod X, the rod S', and of the rod T''', provided with a handle, T'', substantially as herein shown and described, and for the purpose set forth.

8. In a tricycle, the combination, with the axle B, of the disk H, rigidly mounted thereon and provided with a rim, H', the disks G, loosely mounted on the axle and provided with pivoted clutch-dogs G', and with notches $d$ in the edge, the arms F, loosely mounted on the axle, the pawls F', pivoted to the arms F, the connecting-rods E', the foot-levers E, and the springs J K, substantially as herein shown and described, and for the purposes set forth.

SAMUEL N. SILVER.

Witnesses:
OSCAR F. GUNZ,
C. SEDGWICK.